(12) United States Patent
Ogata

(10) Patent No.: US 8,360,185 B2
(45) Date of Patent: Jan. 29, 2013

(54) HYBRID ELECTRIC AUTOMOBILE

(75) Inventor: Hisashi Ogata, Kiryu (JP)

(73) Assignee: Mitsuba Corporation, Gunma (JP)

( * ) Notice: Subject to any disclaimer, the term of this patent is extended or adjusted under 35 U.S.C. 154(b) by 82 days.

(21) Appl. No.: 12/735,752

(22) PCT Filed: Feb. 16, 2009

(86) PCT No.: PCT/JP2009/052546
§ 371 (c)(1),
(2), (4) Date: Aug. 12, 2010

(87) PCT Pub. No.: WO2009/102058
PCT Pub. Date: Aug. 20, 2009

(65) Prior Publication Data
US 2010/0307845 A1    Dec. 9, 2010

(30) Foreign Application Priority Data

Feb. 14, 2008 (JP) ................ P2008-033587
Feb. 27, 2008 (JP) ................ P2008-045928

(51) Int. Cl.
*B60K 1/02* (2006.01)
(52) U.S. Cl. ........... 180/65.51; 180/65.265; 180/65.275; 180/65.285
(58) Field of Classification Search ............ 180/65.51
See application file for complete search history.

(56) References Cited

U.S. PATENT DOCUMENTS

| | | | |
|---|---|---|---|
| 5,713,814 A | 2/1998 | Hara et al. | |
| 5,823,280 A * | 10/1998 | Lateur et al. | 180/65.235 |
| 7,195,087 B2 * | 3/2007 | Hatsuda et al. | 180/65.285 |
| 2004/0200654 A1 | 10/2004 | Hatsuda et al. | |
| 2007/0068714 A1 | 3/2007 | Bender | |

FOREIGN PATENT DOCUMENTS

| | | |
|---|---|---|
| CN | 1663837 | 9/2005 |
| DE | 196 31 123 | 2/1997 |
| JP | 7-112620 | 5/1995 |
| JP | 2007-112620 | 5/1995 |

(Continued)

OTHER PUBLICATIONS

Office Action mailing date of Aug. 30, 2012 on the underlying Application No. 200980104304 with English translation thereof.

(Continued)

*Primary Examiner* — Jeffrey J Restifo
*Assistant Examiner* — Erez Gurari
(74) *Attorney, Agent, or Firm* — Kenyon & Kenyon LLP

(57) ABSTRACT

There is provided a four-wheel drive hybrid electric automobile in which right and left front wheels are driven by a liquid fuel engine and right and left rear wheels are driven by switched reluctance motors. A liquid fuel engine (2) for driving first and second front wheels (21, 22) is arranged at a front part of a vehicle body (1), and first and second switched reluctance motors (8, 9) for driving first and second rear wheels (23, 24) are arranged at a rear part of the vehicle body (1). By arranging the first and second switched reluctance motors (8, 9) not in the wheel hubs of the first and second rear wheels (23, 24) but on the rear part of the vehicle body (1) with wide layout space, the degree of freedom when the switched reluctance motors (8, 9) are laid out on the vehicle can be improved.

7 Claims, 5 Drawing Sheets

FOREIGN PATENT DOCUMENTS

| | | |
|---|---|---|
| JP | 9-46820 | 2/1997 |
| JP | 09-121404 | 5/1997 |
| JP | 2000-278809 | 10/2000 |
| JP | 2002-305861 | 10/2002 |
| JP | 2002-321542 | 11/2002 |
| JP | 2005-153790 | 6/2005 |
| JP | 2005-280475 | 10/2005 |
| JP | 2006-288006 | 10/2006 |
| JP | 2006-347429 | 12/2006 |
| JP | 2007-147057 | 6/2007 |
| JP | 2007-210586 | 8/2007 |

OTHER PUBLICATIONS

Decision of Rejection mailing date of Aug. 14, 2012 on the underlying Application No. 2009-553482 with English translation thereof.

* cited by examiner

US 8,360,185 B2

1
HYBRID ELECTRIC AUTOMOBILE

The present application claims priority on Japanese Patent Application No. 2008-33587, filed Feb. 14, 2008, and Japanese Patent Application No. 2008-45928, filed Feb. 27, 2008, the contents of which are incorporated herein by reference.

TECHNICAL FIELD

The present invention relates to a hybrid electric automobile, and specifically, to a four-wheel drive hybrid electric automobile which drives right and left front wheels with a liquid fuel engine, and drives right and left rear wheels with switched reluctance motors.

BACKGROUND ART

In recent years, a so-called four-wheel drive hybrid automobile using an electric motor as a driving source is suggested. Additionally, among four-wheel drive hybrid electric automobiles, an electric automobile which drives right and left front wheels with a liquid fuel engine and drives right and left rear wheels with a direct-current motor is known (for example, refer to Patent Document 1).

In the four-wheel drive hybrid electric automobile in the example of Patent Document 1, the driving force of an alternating-current (AC) motor is transmitted to a differential gear of a rear wheel via a speed reducer and an electromagnetic clutch, and the driving force of the AC motor is distributed to right and left rear wheels by this differential gear.

However, in such a four-wheel drive hybrid electric automobile, machine parts such as the differential gear and the electromagnetic clutch exist, and reduction of fuel cost is difficult due to the weight of the machine parts. Therefore, further improvement in fuel efficiency by reduction of the weight of the machine parts is required.

Thus, there is suggested a structure which drives the right and left rear wheels (for example, refer to Patent Document 2) in which switched reluctance motors (hereinafter referred to as "SR motors") are directly arranged in the wheel hubs of the right and left rear wheels, respectively, not via a differential gear and an electromagnetic clutch, the output shafts of the SR motors are connected to the brake discs fixed to the wheels, and the driving force of the SR motors is transmitted to the wheels via the brake discs.

On the other hand, generally an automobile transmits rotation of an engine shaft which is an output portion of a liquid fuel engine to the wheels, and travels by the rotation of the wheels.

Then, in order to cope with traveling modes, such as the start of a vehicle on an upward slope, that is, traveling at low speed with high torque, and traveling on a highway, that is, traveling at high speed with low torque, the rotation of the engine shaft is decelerated or accelerated (shifted) by a transmission, and is transmitted to the wheels. That is, the automobile travels by rotating a driving shaft by the rotation of the decelerated or accelerated engine shaft, and rotating the wheels connected to the driving shaft. In particular, since it is necessary to rotate the wheels with large torque in order to start the vehicle from a stopped state, the transmission requires a mechanism which significantly decelerates the rotation of the engine shaft.

Moreover, it is necessary for the vehicle not only to travel forward but also to enter a parking lot or leave the parking lot, or reverse for a change in direction or the like. Therefore, the transmission requires a mechanism which converts the direction of rotation of the engine shaft into rotation in a direction opposite to the direction when traveling forward, transmits the rotation converted into the rotation in the opposite direction to the driving shaft, and rotates the driving shaft in the opposite direction.

FIG. 7 shows an example of a transmission attached to a liquid fuel engine of an automobile. This drawing shows an internal structure of a transmission loaded on an automobile (a so-called FF vehicle) in which a liquid fuel engine is arranged at the front of a vehicle to drive right and left front wheels. An engine shaft 30 of the liquid fuel engine is inserted into the transmission 3, and is rotatably arranged inside the transmission 3.

In the engine shaft 30 to be inserted into the transmission 3, a reverse driving gear 32a, a first driving gear 33a, a second driving gear 34a, a third driving gear 35a, and a fourth driving gear 36a are integrally formed sequentially toward the side (left side on the plane of the sheet) far from the liquid fuel engine from the side (right side on the plane of the sheet) near the liquid fuel engine. Additionally, in the first to fourth driving gears (33a to 36a), the number of teeth z1 of the first driving gear 33a is the smallest, and the number of teeth is set so as to become large in order of the number of teeth z2 of the second driving gear 34a, the number of teeth z3 of the third driving gear 35a, and the number of teeth z4 of the fourth driving gear 36a.

A main shaft 31 which is a driven shaft is rotatably arranged inside the transmission 3, similarly to the engine shaft 30, at a position parallel to the engine shaft 30 which is a main driving shaft. In the main shaft 31, a final driving gear 37a, a reverse driven gear 32b, a first driven gear 33b, a second driven gear 34b, a third driven gear 35b, and a fourth driven gear 36b are provided sequentially toward the side (left side on the plane of the sheet) far from the liquid fuel engine from the side (right side on the plane of the sheet) near the liquid fuel engine. The final driving gear 37a and the reverse driven gear 32b are formed integrally with the main shaft 31.

Meanwhile, a recess-shaped serration 31a which extends in an axial direction is formed at regular pitches in a circumferential direction on the surface of a portion (the left side on the plane of the sheet) in which the final driving gear 37a and reverse driven gear 32b of the main shaft 31 are not formed. The first driven gear 33b, the second driven gear 34b, the third driven gear 35b, and the fourth driven gear 36b are movable in the axial direction along the above-described recess shape of the main shaft 31, the movement of these gears in the circumferential direction is prevented by the main shaft 31. Additionally, the movement of the first to fourth driven shafts (32b to 36b) in the axial direction is controlled by a command from the vehicle.

In the first to fourth driven gears (33b to 36b), the number of teeth Z1 of the first driven gear 33b is the greatest, and the number of teeth is set so as to become small in order of the number of teeth Z2 of the second driven gear 34b, the number of teeth Z3 of the third driven gear 35b, and the number of teeth Z4 of the fourth driven gear 36b.

The first driven gear 33b meshes with the first driving gear 33a, and the first driving gear 33a and first driving gear 33b mesh with each other so as to form a first gear pair 33. Similarly, the second driven gear 34b meshes with the second driving gear 34a, and the second driving gear 34a and the second driving gear 34b mesh with each other so as to form a second gear pair 34, the third driving gear 35b meshes with the third driving gear 35a, and the third driving gear 35a and the second driving gear 35b mesh with each other so as to form a third gear pair 35, a fourth driven gear 36b meshes with the fourth driving gear 36a, and the fourth driving gear 36a and the second driving gear 36b mesh with each other so as to form a fourth gear pair 36.

Here, as described above, although the first to fourth driven gears (33b to 36b) are moved in the axial direction of the main shaft 31 by a command from the vehicle, only one gear pair of the first to fourth gear pairs (33 to 36) is controlled so as to be selected during this movement. Here, the transmission ratio r1 of the first gear pair is Z1/z1, the transmission ratio r2 of the second gear pair is Z2/z2, the transmission ratio r3 of the third gear pair is Z3/z3, and the transmission ratio r4 of the fourth gear pair is Z4/z4. When one gear pair is selected by a command from the vehicle, the main shaft 31 rotates in the transmission ratio (r1 to r4) of a selected gear pair, and the rotation of the engine shaft 30 is decelerated or accelerated.

The driving shaft 39 is rotatably arranged at the transmission 3 at a position parallel to the main shaft 31 similarly to the main shaft 31, a front right wheel driving shaft 39a protrudes from the transmission 3 in one direction (right direction on the plane of the sheet), and a front left wheel driven shaft 39b protrudes from the transmission 3 in the other direction (left direction on the plane of the sheet 9. A differential gear 38 is provided at an axial center portion of the driving shaft 39 inside the transmission 3, and a final driven gear 37b is connected to an outer circumferential portion of the differential gear 38.

The final driven gear 37b meshes with the final driving gear 37a formed integrally with the main shaft 31, and a final gear pair 37 is formed by the final driving gear 37a and the final driving gear 37b. Here, the number of teeth of the final driving gear 37a is defined as zf, the number of teeth of the final driven gear 37b is defined as Zf, and the reduction ratio rf of the final gear pair 37 is Zf/zf. In addition, in general vehicles, the reduction ratio rf is defined as about 3 to about 6.

As described above, the rotation of the engine shaft 30 is shifted by one gear pair selected from the first to fourth gear pairs (33 to 36), and then decelerated by the final gear pair 37, and the driving shaft 39 is rotated. Accordingly, the transmission ratio R of the driving shaft 39 to the engine shaft 30 becomes R1=r1×rf, R2=r2×rf, R3=r3×fr, and R4=r4×rf, R1 becomes the greatest, R2, R3, and R4 become small in this order, and R4 becomes the smallest (R1>R2>R3>R4).

Incidentally, in the case of the start from stop where a low speed and a high torque are required, the transmission ratio R1 is selected. When the number of revolutions of the engine shaft 30 is defined as Ne, the number of revolutions Nd of the driving shaft 39 in the case of the transmission ratio R1 becomes Nd=Ne/R1, and torque is increased while the number of revolutions becomes small. In addition, in general vehicles, often, the transmission ratio R1 is set to about 11 to 15, the transmission ratio R2 is set to about 6 to 9, the transmission ratio R3 is set to about 4 to 7, and the transmission ratio R4 is set to 3 to 5.

Next, the structure and operation of the transmission 3 for moving a vehicle backward will be described. As described above, the reverse driving gear 32a is formed integrally with the engine shaft 30 at the end of the engine shaft 30 inside the transmission 3 on the side (right side on the plane of the sheet) near the liquid fuel engine 2. Additionally, in the main shaft 31, the reverse driven gear 32b is formed integrally with the main shaft 31. Although the reverse driving gear 32a is arranged at the same position as the reverse driven gear 32b in the axial direction, the reverse driving gear 32a and reverse driven gear 32b are set so as not to directly mesh with each other.

The transmission 3 is equipped with a reverse idle gear 32c which is movable in the axial direction of the engine shaft 30 and the main shaft 31 which are arranged parallel to each other. The reverse idle gear 32c meshes with both the reverse driving gear 32a and the reverse driven gear 32b. In a case where the vehicle is advancing, the reverse idle gear 32c is arranged at a position where the reverse idle gear does not mesh with either the reverse driving gear 32a or the reverse driven gear 32b, and the reverse idle gear moves in the axial direction on a command of moving the vehicle backward from the vehicle, the reverse idle gear is arranged at a position where the reverse idle gear meshes with both the reverse driving gear 32a and the reverse driven gear 32b. When the reverse idle gear 32c meshes with both the reverse driving gear 32a and the reverse driven gear 32b, the rotation of the reverse driving gear 32a is transmitted to the reverse driven gear 32b via the reverse idle gear 32c, and the reverse driven gear 32b rotates.

The rotation of the above-described first to fourth driving gears (33a to 36a) is directly transmitted to the first to fourth driven gears (33b to 36b), whereas similarly to the rotation of the first to fourth driving gears (33a to 36a), the rotation of the reverse driving gear 32a formed integrally with the engine shaft 30 is transmitted to the reverse driven gear 32b via the reverse idle gear 33c. Therefore, the rotation of the reverse idle gear 33c becomes reverse to the direction of rotation of the first to fourth driven gears (33b to 36b), and the main shaft 31 rotates in a direction reverse to the direction at the time of an advance on a command of moving the vehicle backward from the vehicle. The rotation of the main shaft 31 is transmitted to the driving shaft 39 via the final driven gear 37b from the final driving gear 37a, and rotates the driving shaft 39 in a direction reverse to the direction at the time of an advance.

The number of teeth of the reverse driving gear 32a is defined as zr, and the number of teeth of the reverse driven gear 32b is defined as Zr, and the transmission ratio of the reverse gear group 32 composed of the reverse driving gear 32a, the reverse driven gear 32b, and the reverse idle gear 32c is rr=Zr/zr. Accordingly, the transmission ratio Rr at the time of a reverse of the vehicle becomes Rr=rr×rf. In addition, since the start from a stopped state is performed at the time of a reverse, in order to rotate the driving shaft 39 at a low speed with a high torque, the transmission ratio Rr at the time of a reverse of the vehicle is a value close to the transmission ratio R1 at the time of an advance of the vehicle (Rr≅R1). In addition, in general vehicles, the transmission ratio Rr is often about 10 to 14.

In the automobile using the liquid fuel engine as a driving source in this way, there is a need for traveling forward at a wide range of speed from low speed to high speed, and reverse traveling, and as shown in FIG. 7, various combinations of gears are indispensable to the configuration (for example, refer to Patent Document 3). Therefore, irrespective of the fact that the light weight of a transmission is required in reduction in the size and weight of an automobile, there are limits to significant reduction in the size and weight of the transmission.

[Patent Document 1] Japanese Patent Application, First Publication No. 2006-288006

[Patent Document 2] Japanese Patent Application, First Publication No. 2002-305861

[Patent Document 3] Japanese Patent Application, First Publication No. 2007-147057

DISCLOSURE OF INVENTION

Problem to be Solved by the Invention

However, in the above-described conventional technique of the four-wheel drive hybrid electric automobile which drives the front right and left wheels by the liquid fuel engine, and drives right and left rear wheels by the direct-current motor, it is assumed that the degree of freedom in the places where the SR motors are arranged is limited, and it is physically difficult to arrange the SR motors because of the configuration in which the SR motors are arranged in brake discs, brake calipers which give a braking force to the brake discs, and in wheel hubs of the right and left rear wheels in which parking brakes exist. Additionally, in order to arrange the SR motors in the wheel hubs, it is difficult to radiate the heat generated from the SR motors to the outside, and there is a fear that the temperature of the SR motors becomes a high temperature. Moreover, because of the structure in which the SR motors are mechanically connected to the brake discs, there is a problem in that the temperature of the SR motors becomes a high temperature with the frictional heat caused at the time of braking, and the heat radiation of the brake discs deteriorates.

Moreover, there is also a problem in that brake parts are objects for maintenance and inspection which are mandatory at the time of inspection or the like of an automobile, and when the SR motors are arranged in the wheel hubs, maintenance and inspection work becomes complicated.

Thus, a first object of the invention is to arrange the SR motors at a vehicle body other than wheel hubs, thereby providing a four-wheel drive hybrid electric automobile capable of increasing the degree of freedom for the layout, and improving the heat radiation of the SR motors or the brake discs.

Additionally, as described above, the transmission which is provided in the automobile driven only by an ordinary liquid fuel engine has a transmission mechanism with a large transmission ratio which operates at the time of advancing and reversing. In this regard, the liquid fuel engine and electric motor which are used for a hybrid automobile have differences in power performance which are strong points thereof. For example, the liquid fuel engine has better fuel consumption performance at high speed than the fuel consumption performance at low speed, and the electric motor operates with comparatively high input-output efficiency at a time of low speed. It is required that the transmission is miniaturized by utilizing such differences in power performance, thereby positively utilizing the driving of the electric motor when starting forward motion or starting backward motion.

Thus, a second object of the invention is to provide a four-wheel drive hybrid electric automobile capable of miniaturizing a transmission by positively utilizing the driving of the electric motor when starting forward motion or starting backward motion.

Technical Solution

In order to solve the above problems, a hybrid electric automobile of the invention includes a vehicle body of a vehicle, a liquid fuel engine, a transmission, first and second front wheels, a liquid fuel tank, first and second switched reluctance motors, first and second rear wheels, first and second inverters, and a first battery. The liquid fuel engine is arranged at a front part of the vehicle body, and has an engine shaft rotated by combustion of a liquid fuel. The transmission is mechanically connected to the engine shaft of the liquid fuel engine, accelerates or decelerates the rotation of the engine shaft, and has an output portion which outputs the accelerated or decelerated rotation of the engine shaft. The first and second front wheels are rotatably arranged on the right and left of the front part of the vehicle body and mechanically connected to the output portion of the transmission, and are rotated by the engine shaft of the liquid fuel engine via the transmission. The liquid fuel tank is arranged at a rear part of the vehicle body, and stores the liquid fuel to be supplied to the liquid fuel engine. The first and second switched reluctance motors are respectively arranged on the right and left of the rear part of the vehicle body, and have an output shaft. The first and second rear wheels are rotatably arranged on the right and left of the rear part of the vehicle body, are mechanically connected to the output shafts of the first and second switched reluctance motors via reduction mechanisms, respectively, and rotate by the rotation of the output shafts of the first and second switched reluctance motors. The first and second inverters are connected to the first and second switched reluctance motors, and supply first and second motor driving signals for driving the first and second switched reluctance motors. The first battery is connected to the first and second inverters, and supplies to the first and second inverters the electric power for supplying the first and second motor driving signals to the first and second switched reluctance motors.

Additionally, in order to solve the above problems, a hybrid electric automobile of the invention includes a vehicle body of a vehicle, a driving command means, a liquid fuel engine, a transmission, first and second front wheels, a liquid fuel tank, first and second switched reluctance motors, first and second rear wheels, first and second inverters, a first battery, a first generator, a plug-in device, first and second front wheel rotation sensors, first and second rear wheel rotation sensors, a rotation signal processing means, a first control device, and a second control device.

The driving command means outputs a start signal for an advance of the vehicle and a start signal for a reverse of the vehicle by the passenger's operation. The liquid fuel engine is arranged at a front part of the vehicle body, and has an engine shaft rotated by combustion of a liquid fuel. The transmission is mechanically connected to the engine shaft of the liquid fuel engine, accelerates or decelerates the rotation of the engine shaft, and has a driving shaft which outputs the accelerated or decelerated rotation of the engine shaft. Additionally, the transmission ratio of the rotation of the driving shaft to the rotation of the engine shaft is 10 or less. The first and second front wheels are rotatably arranged on the right and left of the front part of the vehicle body and mechanically connected to the driving shaft of the transmission, and are rotated by the engine shaft of the liquid fuel engine via the transmission. The liquid fuel tank is arranged at a rear part of the vehicle body, and stores the liquid fuel to be supplied to the liquid fuel engine. The first and second switched reluctance motors have output shafts respectively arranged on the right and left of the rear part of the vehicle body, and drive the vehicle in a direction in which the vehicle advances or reverses. The first and second rear wheels are rotatably arranged on the right and left of the rear part of the vehicle body, are mechanically connected to the output shafts of the first and second switched reluctance motors via reduction mechanisms, respectively, and rotate by the rotation of the output shafts of the first and second switched reluctance motors. The first and second inverters are connected to the first and second switched reluctance motors, generate first and second motor driving signals for driving the first and second switched reluctance motors, and supply the first and second motor driving signals to the first and second switched reluctance motors, respectively. The first battery is connected to the first and second inverters, and supplies to the first and second inverters the electric power for generating the first and second motor driving signals. The first generator is connected to the first battery and arranged in the vicinity of the liquid fuel engine, generates electric power by the rotation of the engine shaft of the liquid fuel engine, and supplies the generated electric power to the first battery. The plug-in device is arranged at the vehicle body and connected to the first battery, has a connecting terminal with a home plug, and supplies the electric power from the home power source to the first battery. The first and second front wheel rotation sensors are provided in the vicinity of the first and second front wheels, and detect rotational information on the first and second front wheels. The first and second rear wheel rotation sensors are provided in the vicinity of the first and second rear wheels, and detect rotational information on the first and second rear wheels. The rotation signal processing means is connected to the first and second front wheel sensors and the first and second rear wheel sensors, processes the rotational information on the first and second front wheels and the first and second rear wheels, and outputs the speed signal of the vehicle. The first control device is connected to the rotation signal processing means, generates a first driving control signal which drives the first and second front wheels by the liquid fuel engine when the speed signal output from the rotation signal processing means exceeds a predetermined first value, and supplies a first driving control signal to the liquid fuel engine. The second control device is connected to the driving command means, the rotation signal processing means, and the first and second inverters. Additionally, the second control device outputs to the first and second inverters an advance command signal which commands generation of the first and second motor driving signals for driving the vehicle in a direction in which the vehicle advances until the speed signal output from the rotation signal processing means reaches a predetermined second value greater than the first value upon receiving a start signal for an advance from the driving command means. Moreover, the second control device outputs to the first and second inverters a reverse command signal which commands generation of the first and second motor driving signals for driving the vehicle in a direction in which the vehicle reverses upon receiving a start signal for a reverse from the driving command means.

Effects of the Invention

As described above, by arranging the switched reluctance motors not in the wheel hubs but at the rear part of the vehicle body, it is possible to increase the degree of freedom for the layout of the switched reluctance motors, and improve the heat radiation of the SR motors or brake discs.

Additionally, as described above, by adopting a configuration in which not the liquid fuel engine but the switched reluctance motors (hereinafter referred to as "SR motors") are driven when starting forward motion, the transmission ratio of the transmission connected to the liquid fuel engine can be 10 or less, and the number of parts of the transmission gear can be reduced. Additionally, the reverse gear group of the transmission can be reduced by adopting a configuration in which the switched reluctance motors are driven even at the time of reversing. A four-wheel drive hybrid automobile including a transmission which is made small and lightweight can be provided by this reduction.

DESCRIPTION OF REFERENCE NUMERALS

1: VEHICLE BODY
2: LIQUID FUEL ENGINE
3: TRANSMISSION
4: FIRST GENERATOR
40: SECOND GENERATOR
5: FIRST BATTERY
50: SECOND BATTERY
6: PLUG-IN DEVICE
8: FIRST SWITCHED RELUCTANCE MOTOR (SR MOTOR)
80: FIRST INVERTER
9: SECOND SWITCHED RELUCTANCE MOTOR (SR MOTOR)
90: SECOND INVERTER
10: FIRST REDUCTION GEAR (REDUCTION MECHANISM)
11: SECOND REDUCTION GEAR (REDUCTION MECHANISM)
12: FUEL TANK
13: FUEL SUPPLY MEANS
14: FIRST ROTATION SENSOR
15: SECOND ROTATION SENSOR
16: THIRD ROTATION SENSOR
17: FOURTH ROTATION SENSOR
18: ROTATION PROCESSING MEANS
19: FIRST CONTROL DEVICE
20: SECOND CONTROL DEVICE
21: DRIVING COMMAND MEANS
22: FIRST FRONT WHEEL
23: SECOND FRONT WHEEL
24: FIRST REAR WHEEL
25: SECOND REAR WHEEL

BEST MODE FOR CARRYING OUT THE INVENTION

Next, a first embodiment of this invention will be described with reference to FIG. 1.

Figure 1:
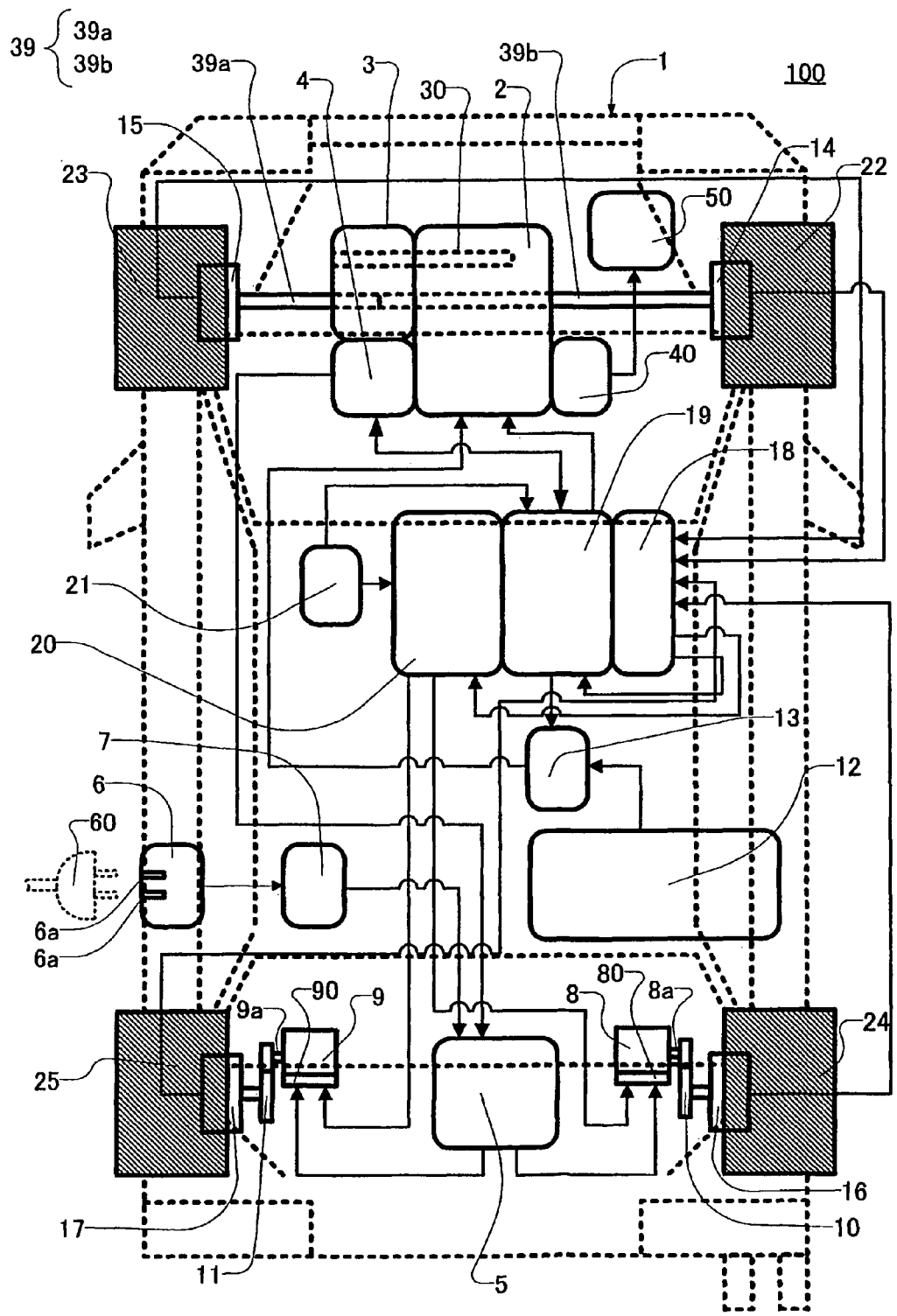
FIG. 1 is a system block diagram of a hybrid electric automobile in an embodiment of the invention.

FIG. 1 is a system block diagram showing a system configuration of a four-wheel drive hybrid electric automobile of the invention. A liquid fuel engine 2 is arranged at a front part of a vehicle body 1 of the four-wheel drive hybrid electric automobile (hereinafter referred as "hybrid 4WD") 100, and the liquid fuel engine 2 has an engine shaft 30 rotated by the combustion of a liquid fuel.

A liquid fuel tank 12 is arranged at a rear part of the vehicle body 1 to store the liquid fuel to be supplied to the liquid fuel engine 2. Additionally, a fuel supply means 13 for supplying the liquid fuel stored in the liquid fuel tank 12 to the liquid fuel engine 2 is provided between the liquid fuel tank 12 and the liquid fuel engine 2.

A transmission 3 is mechanically connected to the engine shaft 30 of the liquid fuel engine 2, accelerates or decelerates (shifts) rotation of the engine shaft 30, and has a driving shaft 39 which outputs the accelerated or decelerated (shifted) rotation of the engine shaft 30.

A first front wheel (front right wheel) 22 and a second front wheel (front left wheel) 23 are rotatably arranged on the right and left of the front part of the vehicle body 1. The driving shaft 39 of the above transmission 3 includes a front right wheel driving shaft 39a and a front left wheel driving shaft 39b, a first front wheel 22 and a second front wheel 23 are mechanically connected to the front right wheel driving shaft 39a and the front left wheel driving shaft 39b, and are rotated by the rotation of the engine shaft 30 of the liquid fuel engine 2 via the transmission 3.

First and second SR motors 8 and 9 are arranged on the right and left of a rear part of the vehicle body 1, and the first and second SR motors 8 and 9 are equipped with output shafts 8a and 9a which output rotation of the first and second SR motors 8 and 9. In addition, although SR motors of the same structure are used as for the first and second SR motors 8 and 9, the detailed structure thereof will be described later. By arranging the first and second SR motors 8 and 9 not in the wheel hubs of wheels but at the rear part of the vehicle body 1 in this way, the degree of freedom of the arrangement of the first and second SR motors improves.

A first rear wheel (rear right wheel) 24 and a second rear wheel (rear left wheel) 25 are rotatably arranged on the right and left of the rear part of the vehicle body 1. The first rear wheel 24 is mechanically connected to an output shaft 8a of the first SR motor 8 via a first reduction gear (reduction mechanism) 10, and the second rear wheel 25 is mechanically connected to an output shaft 9a of the second SR motor 9 via a second reduction gear (reduction mechanism) 11. The rotation of the output shafts 8a and 9a of the first and second SR motors 8 and 9 is decelerated and transmitted to the first and second rear wheels 23 and 24.

A first inverter 80 is integrally arranged at and electrically connected to the first SR motor 8, and the first inverter 80 supplies a first motor driving signal for driving the first SR motor 8 to the first SR motor 8. Similarly, in the second SR motor 9, the second inverter 90 is integrally arranged and electrically connected to a motor body of the second SR motor 9, and the second inverter 90 supplies a second motor driving signal for driving the second SR motor 9.

A first battery 5 is arranged at the rear part of the vehicle body 1, and the first battery 5 is connected to the first and second inverters 80 and 90, and supplies to the first and second inverters 80 and 90 the electric power for supplying the first and second motor driving signals to the first and second SR motors 8 and 9 from the first and second inverters 80 and 90. In addition, the first battery 5 of the present embodiment is a lithium ion battery with a storage voltage of 50 V or higher.

A first generator 4, which is connected to the first battery 5, supplies electric power to the first battery 5, and charges the first battery 5, is arranged in the vicinity of the liquid fuel engine 2. The first generator 4 is mechanically connected to the engine shaft of the liquid fuel engine 2, generates electric power by the rotation of the engine shaft, and supplies the generated electric power to the first battery 5.

A plug-in device 6 which has a connecting terminal 6a with a home plug 60 is arranged on the left side face portion (left side on the plane of the sheet) of the vehicle body 1. Additionally, the plug-in device 6 is connected to the first battery 5 via an AC/DC converter 7 which converts a power signal of a home power source with an alternating current of 50 Hz or 60 Hz into a direct current, and is able to charge the first battery 5 also from a home power source from the home plug 60.

First and second front wheel rotation sensors 14 and 15 are provided in the vicinity of the first and second front wheels 21 and 22, and rotational information on the first and second front wheels 21 and 22 is detected by the first and second front wheel rotation sensors 14 and 15. Additionally, first and second rear wheel rotation sensors 16 and 17 are provided in the vicinity of the first and second rear wheels 23 and 24, and rotational information on the first and second front wheels 21 and 22 is detected by the first and second rear wheel rotation sensors 116 and 17.

The first and second front wheel rotation sensors 14 and 15, and the first and second rear wheel rotation sensors 16 and 17 are connected to the rotation processing means 18 respectively provided in the vehicle body 1, and a speed signal of an electric automobile 100 is processed by the rotation processing means 18.

The rotation processing means 18 is connected to the first and second control devices 19 and 20 which are arranged at the vehicle body 1, and the speed signal of the electric automobile (vehicle) 100 processed by the rotation processing means 18 is output to the first and second control devices 19 and 20.

A driving command means 21 is connected to the first control device 19 and the second control device 20, and commands driving of the vehicle. The first control device 19 is connected to the liquid fuel engine 2, and generates a first driving control signal which drives the first and second front wheels 21 and 22 by the liquid fuel engine 2, and supplies the first driving signal to the liquid fuel engine 5. Additionally, the first control device 19 is also connected to the fuel supply means 13, and also controls the supply of fuel from the fuel tank 12 to the liquid fuel engine 5. Moreover, the first control device 19 is connected to the first generator 4, and also controls the electric power generated by the first generator 4.

The second control device 20 is connected to the first and second inverters 80 and 90, and outputs to the first and second inverters 80 and 90 a command signal for commanding supply of the first and second motor driving signals for driving the first and second SR motors 8 and 9.

Figure 2:
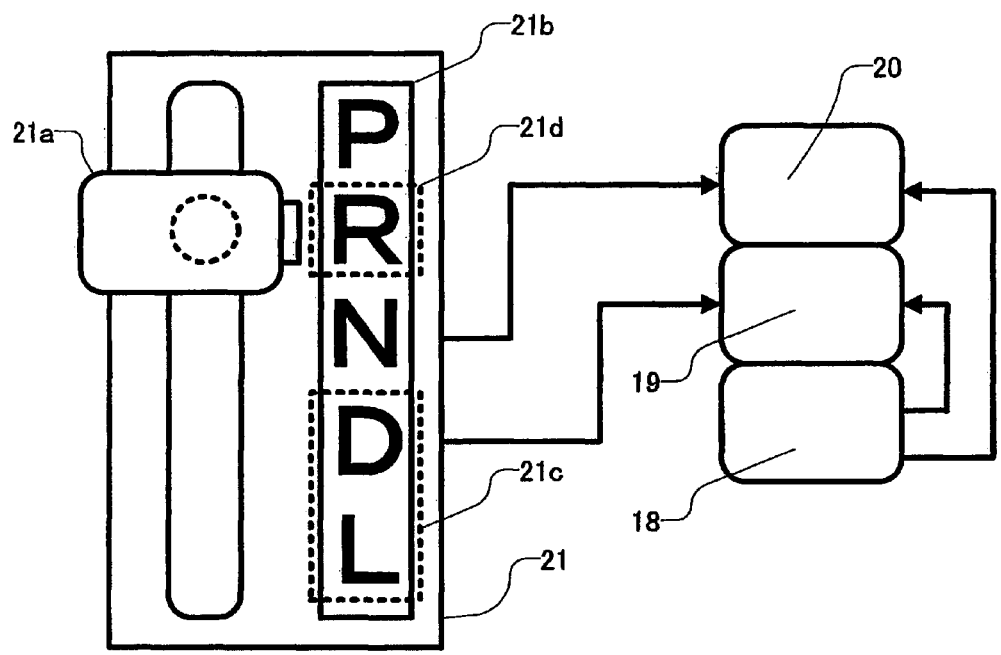
FIG. 2 is a view showing a driving designating means in the embodiment of the invention.
Figure 3:
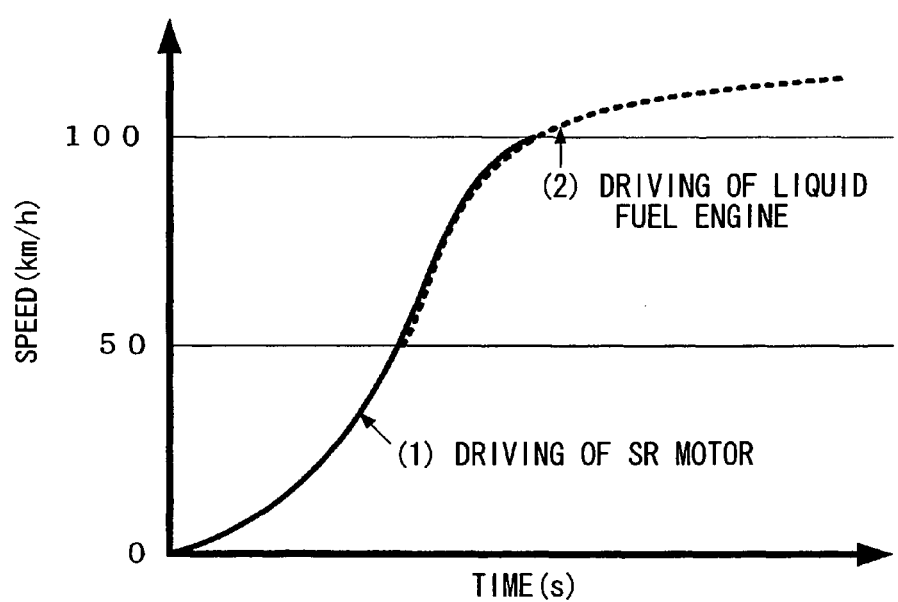
FIG. 3 is a view illustrating switching of the driving of a vehicle by a liquid fuel engine and driving of the vehicle by an SR motor.

Next, switching of the driving by the liquid fuel engine 2 and driving by the first and second SR motors 8 and 9 will be described with reference to FIGS. 2 and 3. FIG. 2 shows the configuration of the driving command means 21, the first and second control devices 19 and 20, and the rotation processing means 18. Additionally, FIG. 3 shows switching of the driving by the liquid fuel engine 2 and the driving by the first and second SR motors 8 and 9. In this drawing, the horizontal axis represents time, and the vertical axis represents the speed of a vehicle. Additionally, a solid line (1) in the drawing represents a state where the vehicle 100 is being driven by the first and second SR motors 8 and 9, and a broken line (2) represents a state where the vehicle 100 is being driven by the liquid fuel engine 2.

As shown in FIG. 2, the driving command means 21 includes a shift lever 21a which designates a driving mode by passenger's operation, and a display unit 21b which displays the driving mode. In addition, the hybrid 4WD of the present embodiment includes an automatic transmission 3, and setting of the driving command means 21 corresponds to the transmission 3. That is, "P (parking)" of the driving mode represents stop of a vehicle, "R (reverse)" represents a reverse driving mode 21d of the vehicle, "N (neutral)" represents stop of the driving of the wheels (22 to 25) of the vehicle, and both "D (drive)" and "L (low)" represents a forward driving mode 21c of the vehicle.

The second control device 20 is connected to the driving designating means 21, first and second inverters 80 and 90, and the rotation signal processing means 18. In order to start moving a vehicle forward, when a passenger operates the shift lever 21a and the driving mode of the vehicle is designated to the forward driving mode 21c, a start signal for an advance is input to the second control device 20 from the driving designating means 21. In this case, the second control device 20 operates in preference to the first control device 19. That is, an advance command signal for commanding supply of the first and second motor driving signals for driving the first and second SR motors 8 and 9 is output to the first and second inverters 80 and 90 from the second control device 20. By this command signal, the vehicle starts moving forward from a stopped state.

In order to start moving a vehicle backward, when a passenger operates the shift lever 21a and the driving mode of the vehicle is designated to the reverse driving mode 21d, a start signal for a reverse is input to the second control device 20 from the driving designating means 21. Even in this case, the second control device 20 operates in preference to the first control device 19. That is, a reverse command signal for commanding supply of the first and second motor driving signals for driving the first and second SR motors 8 and 9 is output to the first and second inverters 80 and 90 from the second control device 20. By this command signal, the vehicle starts moving backward from a stopped state. In addition, in the case of a reverse of the vehicle, setting is made so as to drive the first and second SR motors 8 and 9 by a command signal from the second control device 20, and the liquid fuel engine 2 does not operate.

In the case of an advance of the vehicle, the control of switching the driving of the first and second SR motors 8 and 9 and the driving by the liquid fuel engine 2 is performed according to the speed of the vehicle, and so the contents of the control will be described. After the vehicle starts moving forward from a stopped state by a command signal from the second control device 20, a command signal for commanding supply of the first and second motor driving signals for driving the first and second SR motors 8 and 9 is output to the first and second inverters 80 and 90 until a speed signal output from the rotation signal processing means 18 reaches a predetermined second value (100 [km/h] in FIG. 2).

The first control device 19 is connected to the liquid fuel engine 2, generates a first driving control signal which drives the first and second front wheels 21 and 22 by the liquid fuel engine 5 when a speed signal output from the rotation signal processing means 18 exceeds a predetermined first value (50 [km/h] in FIG. 2), and supplies the first driving signal to the liquid fuel engine 5. Additionally, the first control device 19 is also connected to the fuel supply means 13, and also controls supply of fuel from the fuel tank 12 to the liquid fuel engine 5. Moreover, the first control device 19 is connected to the first generator 4, and also controls the electric power generated by the first generator 4.

In the state of low speed to medium speed until the speed signal output from the rotation signal processing means 18 reaches the predetermined first value (50 [km/h] in FIG. 2), the fuel consumption per travelling distance of the liquid fuel engine 2 increases compared to the state of medium speed to high speed, and the state of low speed to medium speed is a fuel-inefficient state. Then, only the first and second SR motors 8 and 9 are positively driven by the second control device 20 in such a state of low speed to medium speed.

Next, in the state of medium speed to high speed where the speed signal has the first value (50 [km/h] in FIG. 2) to the second value (100 [km/h] in FIG. 2), fuel efficiency becomes comparatively good. Thus, the first and second SR motors 8 and 9 are driven by the second control device, and the liquid fuel engine 5 is used together and driven by the first control device 19.

Moreover, in the state of high speed where the speed signal exceeds the second value (100 [km/h] in FIG. 2), fuel efficiency further improves. Thus, the driving of the first and second SR motors 8 and 9 by the second control device is stopped, and only the liquid fuel engine 5 is positively driven by the first control device 19. By switching such driving, fuel efficiency is improved. Moreover, fuel efficiency can be further improved by enabling the first battery 5 to be charged from a home power source.

In addition, in the present embodiment, the first value and the second value are set to different values so that the driving of the vehicle 100 by the liquid fuel engine 2 and the driving of the vehicle 100 by the first and second SR motors 8 and 9 are simultaneously performed in the state of medium speed to high speed. However, the first value and second value may be set to almost the same value, and at the first value (second value) the driving of the vehicle 100 by the liquid fuel engine 2 is set to be switched from the driving of the vehicle 100 by the first and second SR motors 8 and 9 without providing a speed zone where the driving of the vehicle 100 by the liquid fuel engine 2 and the driving of the vehicle 100 by the first and second SR motors 8 and 9 are simultaneously performed.

In the present embodiment, separately from the first battery 5 which supplies electric power to the first and second SR motors 8 and 9, a second battery 50 composed of a lead battery with a storage voltage of 50 V or lower is included similarly to an ordinary vehicle. The second battery 50 supplies electric power to the auxiliary machinery of the vehicle, such as head lamps except for the first and second SR motors 8 and 9. Additionally, separately from the first generator 4 for charging the first battery 5, the second generator 40 connected to the second battery 50 for charging the second battery 50 is included similarly in an ordinary vehicle. The second generator 40 is arranged in the vicinity of the liquid fuel engine 2 similarly to the first generator 4, generates electric power by the rotation of the engine shaft of the liquid fuel engine 2, and supplies the generated electric power to the second battery 50.

Figure 4:
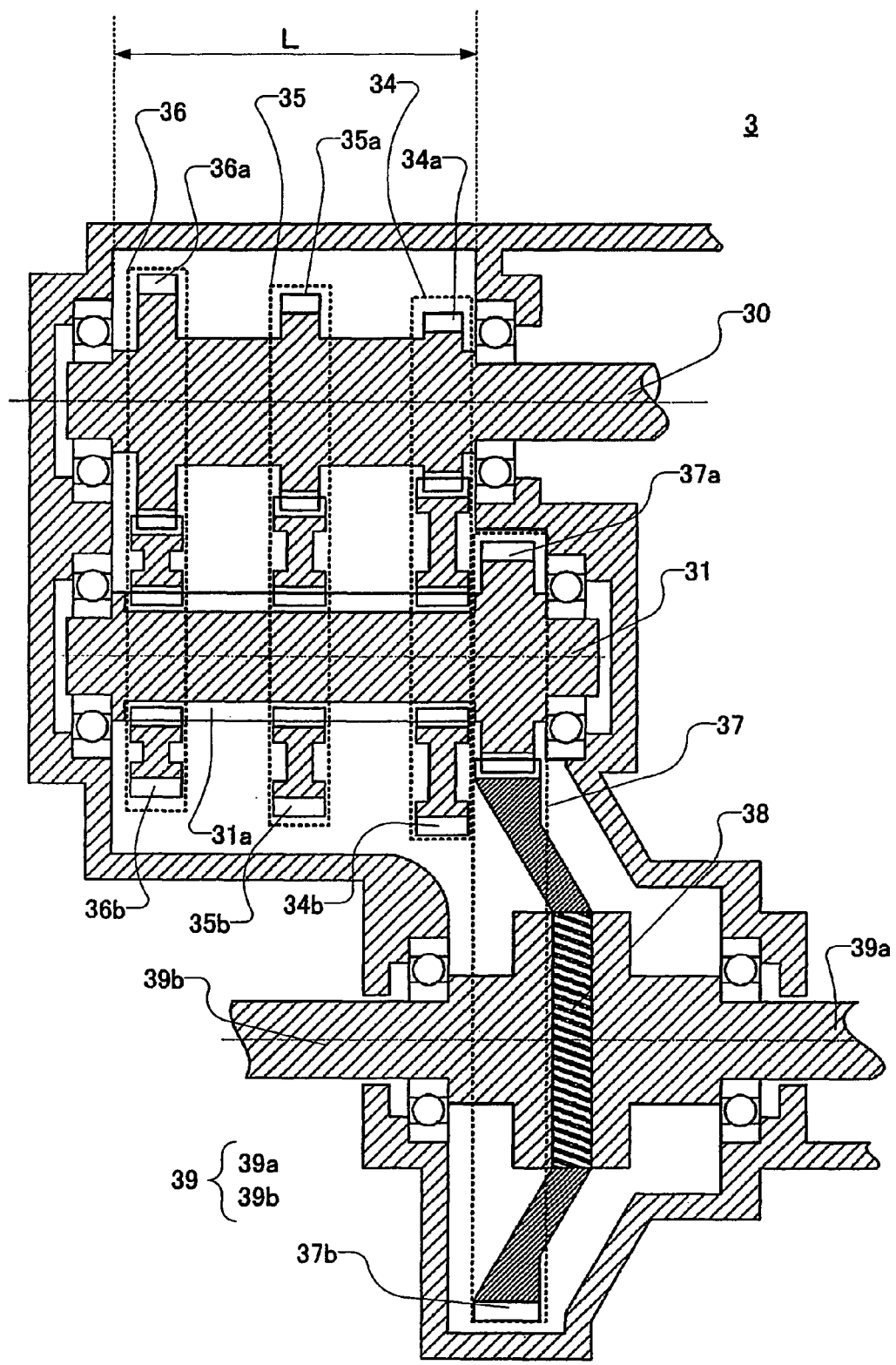
FIG. 4 is a view showing the internal structure of a transmission in the embodiment of the invention.
Figure 5:
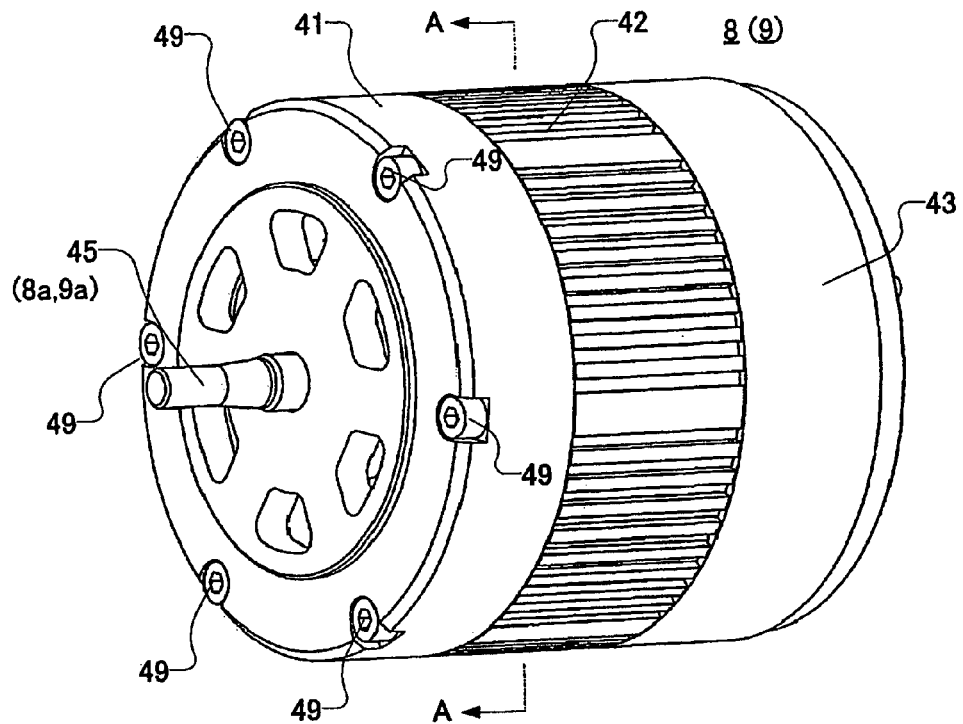
FIG. 5 is a perspective view of the SR motor in the embodiment of the invention.
Figure 6:
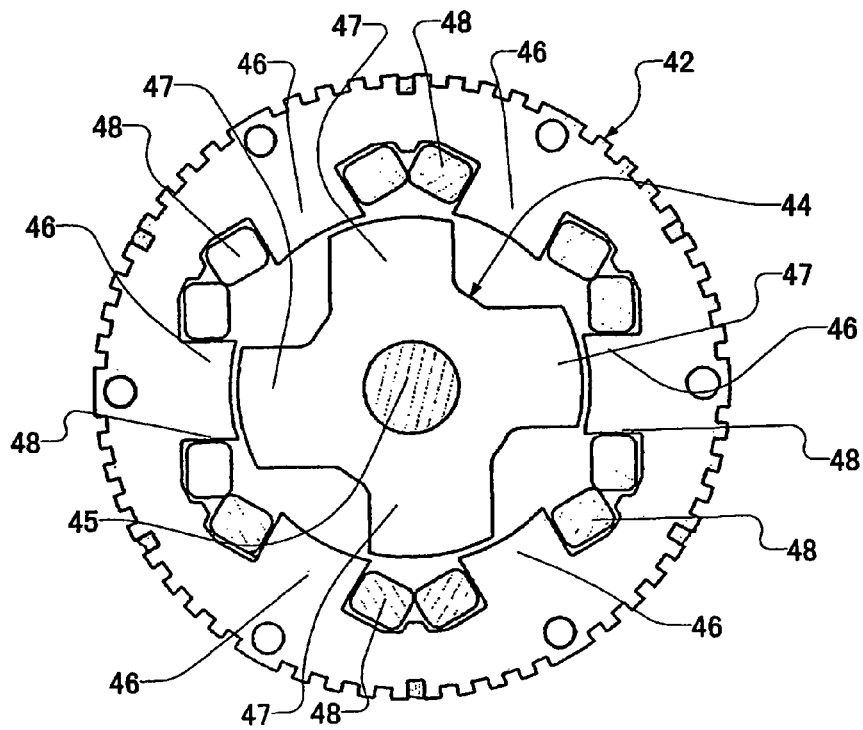
FIG. 6 is a sectional view of the SR motor shown along A-A in FIG. 5.

As described above, until the speed of the vehicle reaches the first value from the start to the front of the vehicle, and at the time of a reverse, only the first and second SR motors 8 and 9 are driven, and the liquid fuel engine 2 does not operate. Accordingly, a mechanism for making the vehicle travel forward at low speed, and moving the vehicle backwards becomes unnecessary for the transmission 3. FIG. 4 shows the structure of the transmission 3 of the present embodiment, and the structure of the transmission will be described below based on this drawing.

As shown in FIG. 4, an engine shaft 30 of the liquid fuel engine 2 is inserted into the transmission 3, and is rotatably arranged inside the transmission 3. In the engine shaft 30 to be inserted into the transmission 3, a second driving gear 34a, a third driving gear 35a, and a fourth driving gear 36a are integrally formed sequentially toward the side (left side on the plane of the sheet) far from the liquid fuel engine 2 from the side (right side on the plane of the sheet) near the liquid fuel engine 2. Additionally, in the second to fourth driving gears (34a to 36a), the number of teeth z2 of the second driving gear 34a is the smallest, and the number of teeth becomes larger in order of the number of teeth z3 of the third driving gear 35a and the number of teeth z4 of the fourth driving gear 36a.

A main shaft 31 which is a driven shaft is rotatably arranged inside the transmission 3, similarly to the engine shaft 30, at a position parallel to the engine shaft 30 which is a main driving shaft. In the main shaft 31, a final driving gear 37a, a second driven gear 34b, a third driven gear 35b, and a fourth driven gear 36b are provided sequentially toward the side (left side on the plane of the sheet) far from the liquid fuel engine 2 from the side (right side on the plane of the sheet) near the liquid fuel engine 2. The final driving gear 37a is formed integrally with the main shaft 31.

On the other hand, the recess-shaped serration 31a which extends in the axial direction is formed at regular pitches in the circumferential direction at a circumferential surface portion (left side on the plane of the sheet) in which the final driving gear 37a of the main shaft 31 is not formed, the second driven gear 34b, the third driven gear 35b, and the fourth driven gear 36b are movable in the axial direction along the above-described mentioned recess shape of the main shaft 31, and are restrained by the main shaft 31 in the circumferential direction. Additionally, the movement of the second to fourth driven shafts (34b to 36b) in the axial direction is controlled by a command from the vehicle.

In the second to fourth driven gears (34b to 36b), the number of teeth Z2 of the second driven gear 34b is the greatest, and the number of teeth becomes smaller in order of the number of teeth Z3 of the third driven gear 35b and the number of teeth Z4 of the fourth driven gear 36b.

The second driven gear 34b is set so as to mesh with the second driving gear 34a, and the second driving gear 34a and second driving gear 34b mesh with each other so as to form a second gear pair 33. Similarly, the third driven gear 35b is set so as to mesh with the third driving gear 35a, and the third driving gear 35a and the second driving gear 35b mesh with each other so as to form a third gear pair 35, a fourth driven gear 36b meshes with the fourth driving gear 36a, and the fourth driving gear 36a and the second driving gear 36b mesh with each other so as to form a fourth gear pair 36.

As described above, although the second to fourth driven gear (34b to 36b) are moved in the axial direction of the main shaft 31 by a command from the vehicle, only one gear pair of the second to fourth gear pairs (34 to 36) is controlled so as to be selected. Here, the transmission ratio r2 of the second gear pair is Z2/z2, the transmission ratio r3 of the third gear pair is Z3/z3, and the transmission ratio r4 of the fourth gear pair is Z4/z4. When one gear pair is selected by a command from the vehicle, the main shaft 31 rotates in the transmission ratio (r2 to r4) of a selected gear pair, and the rotation of the engine shaft 30 is decelerated or accelerated.

Figure 7:
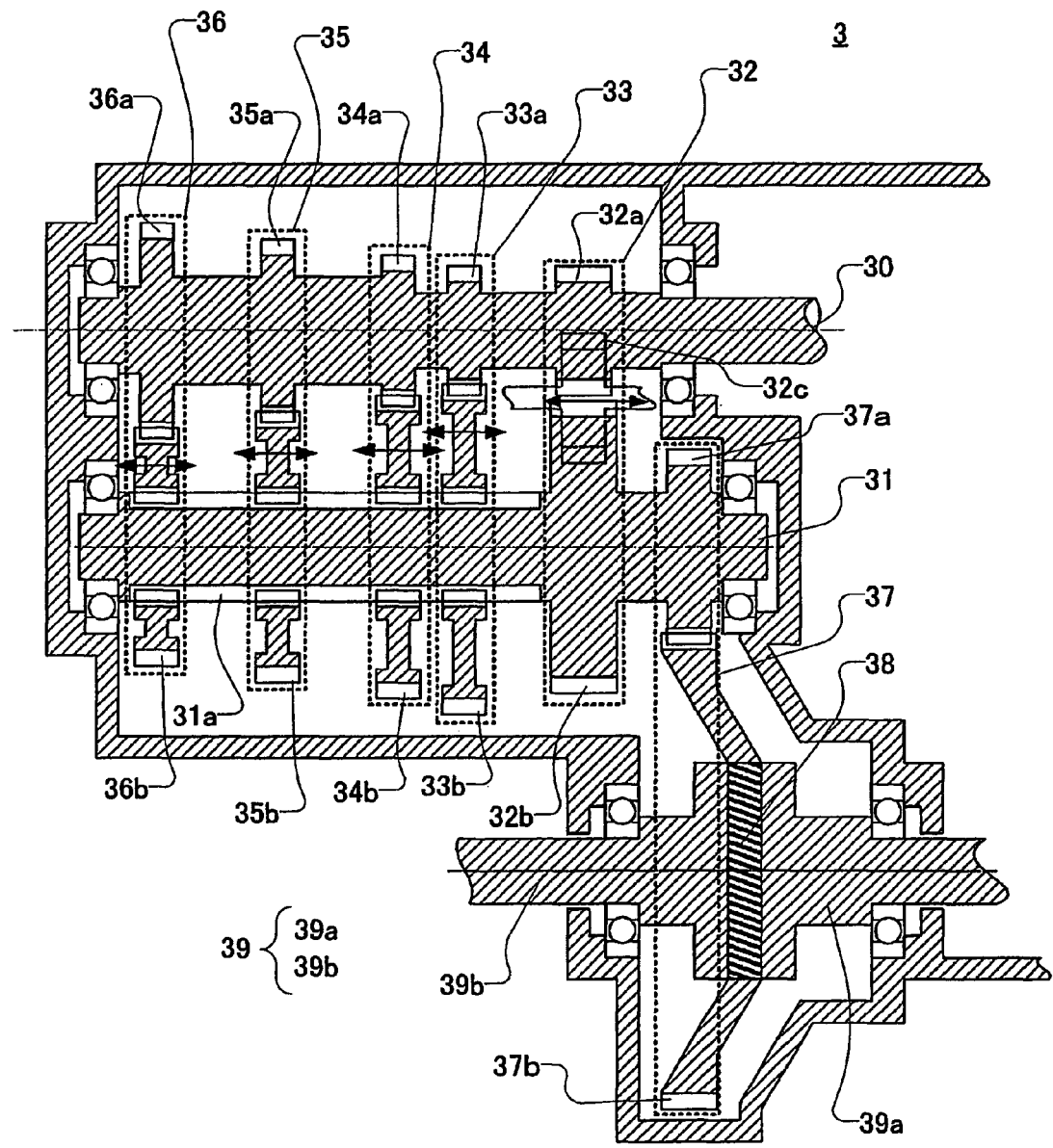
FIG. 7 is a view closing the internal structure of a transmission in a conventional example.

As described above, in a case where the hybrid 4WD of the present embodiment starts moving forward, the movement is performed by the operation of the first and second SR motors 8 and 9 without operating the liquid fuel engine 2. Therefore, it is not necessary to rotate the driving shaft 39 with the torque required at the time of starting. Accordingly, the first gear pair 33 composed of the first driving gear 33a and the first driven gear 33b with a large transmission ratio as shown in FIG. 7 as the conventional example becomes an unnecessary structure. Accordingly, the number of parts is reduced compared to the conventional example.

The driving shaft 39 is rotatably arranged at the transmission 3 at a position parallel to the main shaft 31 similarly to the main shaft 31, a front right wheel driving shaft 39a protrudes from the transmission 3 in one direction (right direction on the plane of the sheet), and a front left wheel driving shaft 39b protrudes from the transmission 3 in the other direction (left direction on the plane of the sheet 9. A differential gear 38 is provided at an axial center portion of the driving shaft 39 inside the transmission 3, and a final driven gear 37b is connected to an outer circumferential portion of the differential gear 38.

The final driven gear 37b meshes with the final driving gear 37a formed integrally with the main shaft 31, and a final gear pair 37 is formed by the final driving gear 37a and the final driving gear 37b. Here, the number of teeth of the final driving gear 37a is defined as zf, the number of teeth of the final driven gear 37b is defined as Zf, and the reduction ratio rf of the final gear pair 37 is Zf/zf. In addition, in general vehicles, the reduction ratio rf is about 3 to about 6.

As described above, the rotation of the engine shaft 30 is shifted by one gear pair selected from the second to fourth gear pairs (34 to 36), and then decelerated by the final gear pair 37, and the driving shaft 39 is rotated. Accordingly, the transmission ratio R of the driving shaft 39 to the engine shaft 30 becomes R2=r2×rf, R3=r3×fr, and R4=r4×rf, R2 becomes the greatest, R3 and R4 become smaller in this order, and R4 becomes the smallest (R2>R3>R4).

Incidentally, in a case where medium speed and medium torque in which the liquid fuel engine 2 starts driving are required, the transmission ratio R2 is selected. When the number of revolutions of the engine shaft 30 is defined as Ne, the number of revolutions Nd of the driving shaft 39 in the case of the transmission ratio R2 becomes Nd=Ne/R2. In addition, in general vehicles, often, the transmission ratio R2 is set to about 6 to 9, the transmission ratio R3 is about 4 to 7, and the transmission ratio R4 is 3 to 5. Accordingly, under the traveling conditions from the start to the front where low speed and high torque are required to medium speed and medium torque, in the present embodiment in which the first and second SR motors 8 and 9 are driven, and the liquid fuel engine 2 is not driven, the transmission ratio of the number of revolutions Nd of the driving shaft 39 to the number of revolutions Ne of the engine shaft 30 is set to 10 or less.

In the conventional example shown in FIG. 7, as the structure of the transmission 3 for moving a vehicle backward, the reverse driving gear 32a is formed integrally with the engine shaft 30 at the end, on the side (right side on the plane of the sheet) near the liquid fuel engine, of the engine shaft 30 inside the transmission 3 as described above. In the main shaft 31, the reverse driven gear 32b is formed integrally with the main shaft 31. Moreover, the transmission 3 is equipped with a reverse idle gear 32c which is movable in the axial direction of the engine shaft 30 and the main shaft 31 which are arranged parallel to each other. As described above, as the structure of the transmission 3 for moving the vehicle backwards, the reverse gear group 32 composed of the reverse driving gear 32a, the reverse driven gear 32b, and the reverse idle gear 32c exists.

However, in the present embodiment, the reverse of the vehicle is performed by the driving of the first and second SR motors 8 and 9, and the driving by the liquid fuel engine 2 is not performed. Accordingly, in the transmission 3 of the present embodiment, the above reverse gear group 32 is unnecessary, and the reverse gear group is not provided. Thereby, the number of parts of the transmission 3 is reduced compared to the conventional example.

As described above, since the first gear pair 33 and the reverse gear group 32 with a large transmission ratio are unnecessary configurations in the transmission 3 of the present embodiment unlike the conventional example shown in FIG. 7, the number of parts of the transmission 3 is significantly reduced. Additionally, since the first gear pair 33 and the reverse gear group 32 are not provided, the transmission 3 is made significantly small and lightweight compared to the conventional example. In particular, the axial dimension L of the driving shaft 31 is made significantly small. This provides the four-wheel drive hybrid electric automobile 100 in which miniaturization of the transmission 3 is improved.

Next, the structure of the first and second SR motors 8 and 9 which are used in the embodiment of the invention will be described. Additionally, the SR motors 8 (9) of the same structure which will be described below are used as the first and second SR motors 8 and 9. FIG. 3 is a perspective view of an SR motor, and FIG. 4 is a sectional view of the SR motor shown by A-A in FIG. 2.

The SR motor 8 (9) of the present embodiment includes a cylindrical stator 42 having six stator salient poles 46 which are integrally formed at regular pitches on the radial inside, and a rotor 44 having four rotor salient poles 47 which are rotatably arranged inside the stator 42, and integrally formed at regular pitches on the radial outside. Additionally, the stator 42 and the rotor 44 are formed by integrally stacking thin steel plates. U-phase, V-phase, and W-phase coils 48 are wound around the stator salient poles 46, respectively. A hole for fitting to the shaft 45 is provided at a central portion of the rotor 44, and a shaft 45 is fixed to the fitting hole.

A front bracket 41 and an end bracket 42 are respectively arranged at both ends of the stator 42 in which the rotor 44 is arranged, and are fixed to the stator 42 with set bolts 49. Additionally, bearings (not shown) are respectively arranged at central portions of the front bearing bracket 41 and the end bracket 42, and the shaft 45 of the rotor 44 is rotatably journalled by these bearings. The rotor 44 is rotated by supplying the first or second motor driving signal to the coil 8.

By arranging the first and second SR motors 8 and 9 not in wheel hubs but at the rear part of the vehicle body 1 in this way, it is possible to provide a four-wheel drive hybrid electric automobile capable of increasing the degree of freedom for the layout of the first and second SR motors 8 and 9, and improving the heat radiation of the SR motors or brake discs.

INDUSTRIAL APPLICABILITY

According to the invention, by arranging the SR motors on the vehicle body 1 rather than the wheel hubs, it is possible to provide a four-wheel drive hybrid electric automobile capable of increasing the degree of freedom when the SR motors are laid out on the vehicle, and improving the heat radiation of the SR motors or brake discs. Additionally, it is possible to provide a four-wheel drive hybrid electric automobile capable of miniaturizing a transmission by positively utilizing the driving of the electric motor at the time of start moving to the front or rear.

The invention claimed is:

1. A hybrid electric automobile comprising:
a vehicle body of a vehicle,
a driving command means outputting a start signal for an advance and a start signal for a reverse of the vehicle by the passenger's operation,
a liquid fuel engine arranged at a front part of the vehicle body, and having an engine shaft rotated by combustion of a liquid fuel,
a transmission mechanically connected to the engine shaft of the liquid fuel engine, accelerating or decelerating the rotation of the engine shaft, and having a driving shaft which outputs the accelerated or decelerated rotation of the engine shaft, the transmission ratio of the rotation of the driving shaft to the rotation of the engine shaft is 10 or less,
first and second front wheels rotatably arranged on the right and left of the front part of the vehicle body and mechanically connected to the driving shaft of the transmission, and rotated by the engine shaft of the liquid fuel engine via the transmission,
a liquid fuel tank arranged at a rear part of the vehicle body, and storing the liquid fuel to be supplied to the liquid fuel engine,
first and second switched reluctance motors respectively arranged on the right and left of the rear part of the vehicle body, having an output shaft, and driving the vehicle in a direction in which the vehicle is moved forwards or backwards,
first and second rear wheels rotatably arranged on the right and left of the rear part of the vehicle body, mechanically connected to the output shafts of the first and second switched reluctance motors via reduction mechanisms, respectively, and rotating by the rotation of the output shafts of the first and second switched reluctance motors,
first and second inverters connected to the first and second switched reluctance motors, generating first and second motor driving signals for driving the first and second switched reluctance motors, and supplying the first and second motor driving signals to the first and second switched reluctance motors, respectively,
a first battery connected to the first and second inverters, and supplying to the first and second inverters the electric power for generating the first and second motor driving signals,
a first generator connected to the first battery and arranged in the vicinity of the liquid fuel engine, generating electric power by the rotation of the engine shaft of the liquid fuel engine, and supplying the generated electric power to the first battery,
a plug-in device arranged at the vehicle body and connected to the first battery, having a connecting terminal with a home plug, and supplying the electric power from the home power source to the first battery,
first and second front wheel rotation sensors provided in the vicinity of the first and second front wheels, and detecting rotational information on the first and second front wheels,
first and second rear wheel rotation sensors provided in the vicinity of the first and second rear wheels, and detecting rotational information on the first and second rear wheels,
a rotation signal processing means connected to the first and second front wheel sensors and the first and second rear wheel sensors, processing the rotational information on the first and second front wheels and the first and second rear wheels, and outputting the speed signal of the vehicle,
a first control device connected to the rotation signal processing means, generating a first driving control signal which drives the first and second front wheels by the liquid fuel engine when the speed signal output from the rotation signal processing means exceeds a predetermined first value, and supplying a first driving control signal to the liquid fuel engine, and
a second control device connected to the driving command means, the rotation signal processing means, and the first and second inverters, outputting to the first and second inverters an advance command signal which commands generation of the first and second motor driving signals for driving the vehicle in a direction in which the vehicle is moved forwards until the speed signal output from the rotation signal processing means reaches a predetermined second value greater than the first value upon receiving a start signal for an advance from the driving command means, and outputting to the first and second inverters a reverse command signal which commands generation of the first and second motor driving signals for driving the vehicle in a direction in which the vehicle is moved backward upon receiving a start signal for a reverse from the driving command means.

2. The hybrid electric automobile according to claim 1, wherein the first value and the second value are almost the same.

3. The hybrid electric automobile according to any one of claims 1 and 2, further comprising:
   a second battery which is a lead battery with a storage voltage of 50 V or lower for supplying electric power to vehicular auxiliary machinery other than the first and second switched reluctance motors, and
   a second generator connected to the second battery and arranged in the vicinity of the liquid fuel engine, and supplying the electric power generated by the rotation in the engine shaft of the liquid fuel engine to the second battery,
   wherein the first battery is a lithium ion battery exceeding the storage voltage of 50 V.

4. A hybrid electric automobile comprising:
   a vehicle body of a vehicle,
   a liquid fuel engine arranged at a front part of the vehicle body, and having an engine shaft rotated by combustion of a liquid fuel,
   a transmission mechanically connected to the engine shaft of the liquid fuel engine, accelerating or decelerating the rotation of the rotation of the engine shaft, and having an output portion which outputs the accelerated or decelerated rotation of the engine shaft,
   first and second front wheels rotatably arranged on the right and left of the front part of the vehicle body and mechanically connected to the output portion of the transmission, and rotated by the engine shaft of the liquid fuel engine via the transmission,
   a liquid fuel tank arranged at a rear part of the vehicle body, and storing the liquid fuel to be supplied to the liquid fuel engine,
   first and second switched reluctance motors respectively arranged on the right and left of the rear part of the vehicle body, and having an output shaft,
   first and second rear wheels rotatably arranged on the right and left of the rear part of the vehicle body, mechanically connected to the output shafts of the first and second switched reluctance motors via reduction mechanisms, respectively, and rotating by the rotation of the output shafts of the first and second switched reluctance motors,
   first and second inverters connected to the first and second switched reluctance motors, and supplying first and second motor driving signals for driving the first and second switched reluctance motors,
   a first battery connected to the first and second inverters, and supplying to the first and second inverters the electric power for supplying the first and second motor driving signals to the first and second switched reluctance motors,
   a second battery which is a lead battery with a storage voltage of 50 V or lower for supplying electric power to vehicular auxiliary machinery other than the first and second switched reluctance motors, and
   a second generator connected to the second battery and arranged in the vicinity of the liquid fuel engine, and supplying the electric power generated by the rotation in the engine shaft of the liquid fuel engine to the second battery,
   wherein the first battery is a lithium ion battery exceeding the storage voltage of 50 V.

5. The hybrid electric automobile according to claim 4, further comprising:
   first and second front wheel rotation sensors provided in the vicinity of the first and second front wheels, and detecting rotational information on the first and second front wheels,
   first and second rear wheel sensors provided in the vicinity of the first and second rear wheels, and detecting rotational information on the first and second rear wheels,
   a rotation signal processing means connected to the first and second front wheel sensors and the first and second rear wheel sensors, processing the rotational information on the first and second front wheels and the first and second rear wheels, and outputting the speed signal of the vehicle,
   a first control device connected to the rotation signal processing means, generating a first driving control signal which drives the first and second front wheels by the liquid fuel engine when the speed signal output from the rotation signal processing means exceeds a predetermined first value, and supplying a first driving control signal to the liquid fuel engine, and
   a second control device connected to the rotation signal processing means, and the first and second inverters, and outputting to the first and second inverters a command signal for supplying the first and second motor driving signals for driving the first and second switched reluctance motors until the speed signal output from the rotation signal processing means reaches a predetermined second value greater than the first value.

6. The hybrid electric automobile according to claim 5, further comprising a first generator connected to the first battery and arranged in the vicinity of the liquid fuel engine, generating electric power by the rotation of the engine shaft of the liquid fuel engine, and supplying the generated electric power to the first battery, and
   a plug-in device arranged at the vehicle body and connected to the first battery, having a connecting terminal with a home plug, and supplying the electric power from the home power source to the first battery.

7. The hybrid electric automobile according to any one of claims 5 and 6,
   wherein the first value and the second value are almost the same.

* * * * *